United States Patent [19]
Shimoyama et al.

[11] Patent Number: 5,276,761
[45] Date of Patent: Jan. 4, 1994

[54] HOLLOW WAVEGUIDE FOR ULTRAVIOLET WAVELENGTH REGION LASER BEAMS

[75] Inventors: Masashi Shimoyama; Kazuo Kinoshita, both of Kanagawa; Naoki Tsuchiya; Tohru Fukatsu, both of Tokyo, all of Japan

[73] Assignee: Ebara Corporation, Tokyo, Japan

[21] Appl. No.: 759,598

[22] Filed: Sep. 16, 1991

[51] Int. Cl.$^5$ .............................................. G02B 6/20
[52] U.S. Cl. ............................................... 385/125
[58] Field of Search ...................................... 385/125

[56] References Cited

U.S. PATENT DOCUMENTS

| | | | |
|---|---|---|---|
| 3,582,187 | 6/1971 | Skillman | 385/125 |
| 3,583,786 | 6/1971 | Marcatili | 385/125 |
| 3,973,828 | 8/1976 | Onoda et al. | 385/125 |

OTHER PUBLICATIONS

"Hollow Tube Guide for Excimer Lasers", Hashishin et al, pp. 5-9, Translated Portion Only.
"Development of Optical Fiber for Ultraviolet Laser (III)", Okada et al, pp. 11-15, Translated Portion Only.
"Hollow Metallic and Dielectric Waveguides for Long Distance Optical Transmission and Lasers", The Bell System Technical Journal, Jul. 1964, pp. 1783-1809.

Primary Examiner—Rodney B. Bovernick
Assistant Examiner—Stephen W. Barns
Attorney, Agent, or Firm—Nikaido, Marmelstein, Murray & Oram

[57] ABSTRACT

A hollow waveguide for ultraviolet wavelength region laser beams incorporates a glass tube composed of a glass material exhibiting a high transmissivity with respect to ultraviolet rays and an excellent environment resistant property, and a metal film exhibiting a high reflectivity with respect to the ultraviolet rays and formed outside the glass tube. The glass tube serves as an inner surface of the waveguide. The ultraviolet wavelength region laser beams are transmitted while being reflected by the inner surface of the glass tube and by an interface between the glass tube and the metal film.

5 Claims, 3 Drawing Sheets

HOLLOW WAVEGUIDE FOR ULTRAVIOLET WAVELENGTH REGION LASER BEAMS

BACKGROUND OF THE INVENTION

1. Field of the Art

The present invention relates to a hollow waveguide for transmitting high output ultraviolet laser beams at a high efficiency.

2. Prior Art

Lasers having wavelengths is the ultraviolet region (e.g. an excimer laser) generally have a high energy levels. Those lasers are utilized in a very wide range of applications, such as in laser CVD, surface reforming, photochemical synthesizing and the like. Besides, in the medical field, lasers are employed for in vivo operation in combination with the endoscope. In an industrial field, lasers are used for hyperfine machining.

A requirement essential to utilization of the lasers in the industrial and medical fields is to establish a wave guide technology for guiding laser beams to a desired spot at high efficiency. For example, excimer laser beams having a short wavelength and large peak power are harmful to a living body. However, there exists a difficult problem in terms of transmitting the laser beams safely to a remote part. Thus, it is desired, particularly from the medical sector, that, a waveguide be capable of easily and safely transmitting such laser beams to a position which needs the laser beams.

The following are conventional methods, itemized by (1) through (3), of transmitting high energy laser beams of a laser having a wavelength in the ultraviolet region (e.g., an eximer laser).

(1) A method based on a quartz system optical fiber:

As illustrated in FIG. 6, a core 51 is formed of quartz having a high transmissivity to light in the ultraviolet region. A cladding 52 covering the core 51 is composed of quartz to which an impurity such as fluorine is doped to give thereto a refractive index smaller than that of the core 51. Laser beams 1 are transmitted while being reflected by an interface between the core 51 and the cladding 52. A hydroxyl group may be doped in the core to reduce the absorption of a specific wavelength. Note that FIG. 6(a) is a cross-sectional view depicting the glass fiber, and FIG. 6(b) is a longitudinal sectional view thereof.

(2) A method based on an aluminum tube waveguide:

An aluminum tube 53, as illustrated in FIG. 7, is obtained by forming aluminum into a tubular shape, exhibiting a high reflectivity to the light of the ultraviolet region. The inner surface thereof is polished to increase the reflectivity. This method uses a so-called hollow waveguide for transmitting the beams 1 while being reflected by the inner surface of the aluminum tube 53. Note that FIG. 7(a) is a cross-sectional view showing the aluminum tube, and FIG. 7(b) is a longitudinal sectional view thereof.

(3) A method based on an aluminum plate rectangular hollow path:

As illustrated in FIG. 8, the reflection plates are two metal flat plates 54, 54 which are elongate in the light traveling direction. Dielectric spacers 55 are sandwiched therebetween at bilateral ends. A spacing of the hollow path is kept constant. The beams 1 are transmitted while being reflected by the two metal flat plates 54, 54. These metal flat plates 54, 54 are formed of aluminum having a high reflectivity to light in the ultraviolet region. The inner surface of the hollow path is polished. The dielectric substance serving as a spacer may be formed of Teflon. Note that FIG. 8(a) is a cross-sectional view showing the aluminum plate rectangular hollow path, and FIG. 8(b) is a longitudinal sectional view thereof.

The above-mentioned conventional method (1) based on the quartz system optical fiber, however, presents the following problems. The damage threshold value of an incident end surface against the laser beam is low, although the transmitting efficiency is good. Thus, if an energy density of the incident light is large, the incident end surface is destroyed. Besides, light absorption appears in a wavelength corresponding to an inter-atom bond energy of the material of the core 51. Therefore, in specific wavelengths, the transmissivity is extremely low. In addition, time-variations in the transmissivity become large.

In the method (2) based on the aluminum tube waveguide, the incident power can be increased. However, in this method, the inner surface polishing process becomes harder with a narrower diameter of the waveguide. Besides, the reflectivity of the inner surface decreases with the passage of time due to oxidization, resulting in a drop in the transmitting efficiency.

In the method (3) based on the aluminum plate rectangular hollow path, the incident power can be increased as in the case of method (2). In addition, the inner surface polishing process of the reflection plate can be facilitated. It is, however, difficult to manufacture the path with a smaller sectional area (e.g., 1 mm² or thereabouts). Also, as in the case of method (2), the reflectivity of the inner surface drops due to the oxidization, and the transmitting efficiency is thus decreased.

SUMMARY OF THE INVENTION

It is, therefore, an object of the present invention to provide a hollow waveguide for ultraviolet wavelength region laser beams which can eliminate the above mentioned problems, wherein no difficult process such as inner surface polishing and the like is required, the transmitting efficiency does not drop due to an absorption by a light transmitting material, and a drop in reflectivity that is derived from the oxidization of the reflection surface is avoided.

To accomplish the above objects, according to the present invention, there is provided a hollow waveguide for ultraviolet wavelength region laser beams, which comprises: a glass tube composed of a glass material such as quartz exhibiting a high transmissivity with respect to ultraviolet rays and an excellent environment resistant property, the glass tube serving as an inner surface of the waveguide; and a metal film exhibiting a high reflectivity with respect to the ultraviolet rays and formed outside the glass tube, wherein the ultraviolet laser beams are transmitted while being reflected by the inner surface of the glass tube and by an interface between the glass tube and the metal film.

The ultraviolet laser beams may be transmitted while allowing the flow of a fluid substance having a high ultraviolet ray transmissivity through a space within the glass tube.

Since a waveguide of the invention is constructed as described above, laser beams are incident on the inner surface of the waveguide formed by the glass tube. Therefore, the incident area of the laser beams is relatively large, and hence the damage threshold value for the incident energy totally increases even if the damage threshold value per unit area is the same as that of the end surface in the case of the method (1).

The metal film is formed on the outer surface of the glass tube, so that a surface roughness measurement of the metal film is equal to a surface roughness measurement of the outer surface of the glass tube. The surface roughness measurement of the glass tube is approximately several tenths of a micron. It is therefore possible to easily obtain an excellent reflection surface whose surface roughness is smaller than a polished surface roughness measurement of several microns formed by a method such as electrolytic polishing and the like which are adopted in the methods (2) and (3) of above.

The reflection surface of the metal film closely contacts the outer surface of the glass tube. Hence, the reflection surface of the metal film is not exposed to the air. The reflectivity of the reflection surface does not decrease since the surface is not covered with an oxide film.

If desired, a fluid substance exhibiting a high ultraviolet ray transmissivity may flow through an intra-waveguide space. By this, the transmitting efficiency is improved, and at the same moment a time-decline in transmission rate is reduced owing to cooling effects.

The above and other objects, features and advantages of the present invention will become apparent from the following description when taken in conjunction with the accompanying drawings in which a preferred embodiment of the present invention is shown by way of illustrative examples.

BRIEF DESCRIPTION OF THE DRAWINGS

FIGS. 6, 7 and 8 are diagrams each schematically illustrating a conventional waveguide for transmitting high energy laser beams, wherein

PREFERRED EMBODIMENTS OF THE INVENTION

Preferred embodiments of the present invention will hereinafter be described with reference to the accompanying drawings.

Figure 1:
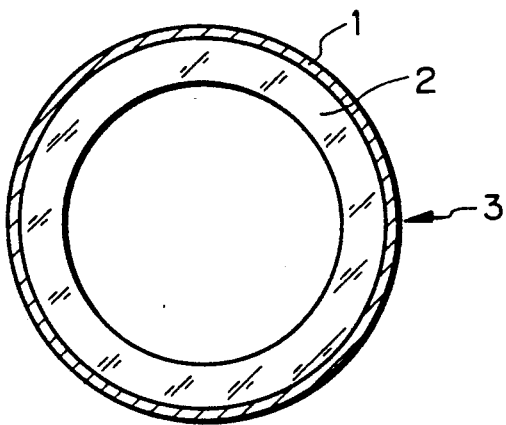
FIG. 1 is a cross-sectional view illustrating a hollow waveguide for ultraviolet laser beams according to the present invention.

FIG. 1 is a cross-sectional view illustrating a hollow waveguide for ultraviolet wavelength region laser beams according to the present invention. As shown in the same Figure, a waveguide 3 includes a quartz tube 2 and an aluminum film 1 formed on the outer surface of the quartz tube 2 by an appropriate method such as CVD, PVD or vacuum evaporation.

Figure 2:
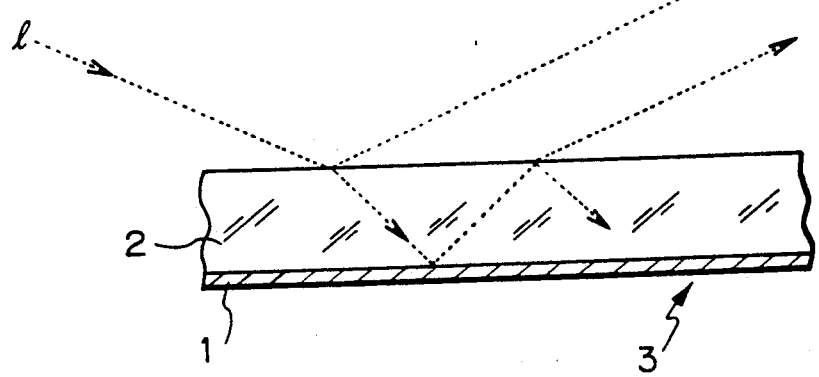
FIG. 2 is a diagram for assisting in explaining how the laser beams travel through the waveguide of the invention.

FIG. 2 is a diagram to assist in explaining how the laser beam travels through the quartz glass tube 2 of the thus constructed waveguide 3. As shown in the Figure, an incident laser beam 1 travels while being reflected by an interface between the quartz tube 2 and the aluminum film 1 as well as by the inner surface of the quartz tube 2.

Figure 3:
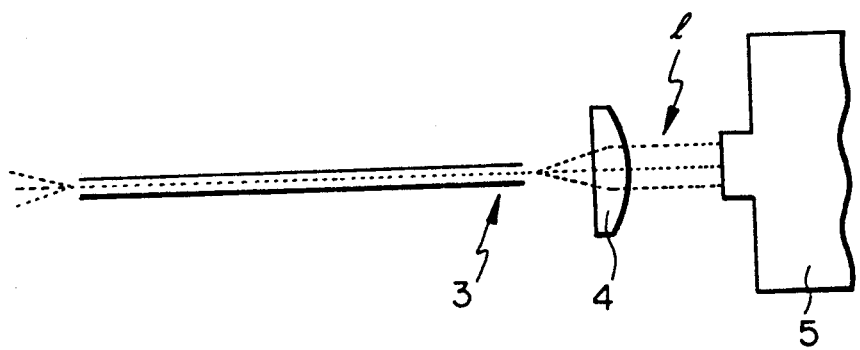
FIG. 3 is a diagram for assisting in explaining how the laser beams are incident on the waveguide.

FIG. 3 is a diagram to assist in explaining how the laser beam 1 is incident on the waveguide 3. The laser beams 1 emerging from a laser system 5 are condensed by a condenser lens 4 and guided into the waveguide 3. The condensed beams, as described above, travel through the waveguide 3.

Figure 4:
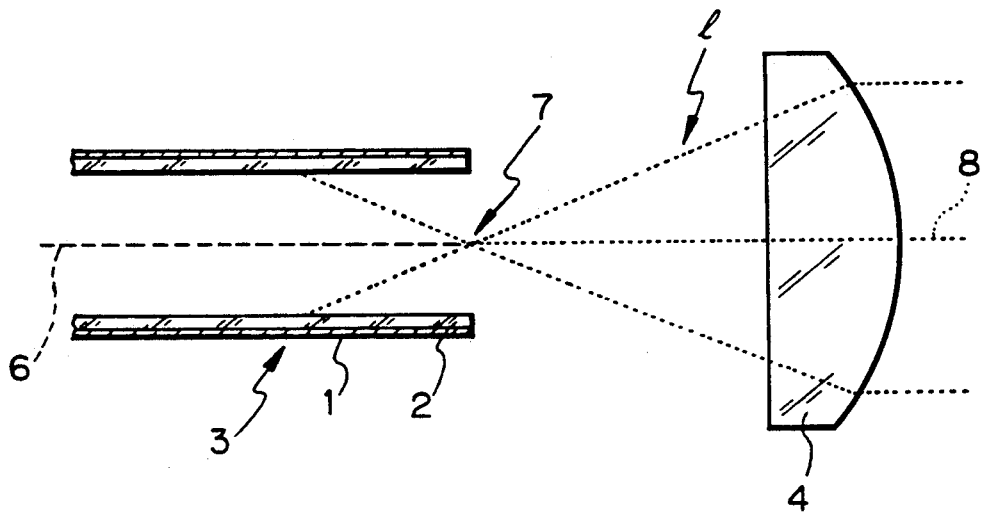
FIG. 4 is a diagram showing the positional relation between a focal point of the condensed laser beams and the waveguide.

FIG. 4 is a diagram showing a positional relation between a focal point of the condensed laser beams 1 and the waveguide 3. An optical axis 8 of the laser beams 1 is made coincident with a central axis 6 of the waveguide 3. The position of the focal point 7 is on the central axis 6 of the waveguide. Thus, all the laser beams 1 are arranged to be incident on an inner surface of the quartz tube 2 of the waveguide 3. The incident laser beams are, as illustrated in FIG. 2, thereby transmitted while being reflected by the inner surface of the quartz tube 2 and by the interface between the quartz tube 2 and the aluminum film 1.

The quartz is a glass having a high transmissivity with respect to the ultraviolet rays and exhibiting an excellent environment resistant property. Aluminum is a metal having a high reflectivity with respect to the ultraviolet rays. Thus, an attenuation in power during a transmission of the incident laser beams while being reflected by the interface between the quartz tube 2 and the aluminum film 1 as well as by the inner surface of the quartz glass tube 2 is extremely small.

Where the quartz tube 2 is employed, the laser beams are incident on the inner surface of this quartz glass tube 2. Thus, an incident area of the laser beams is relatively large, and hence a damage threshold value of an incident energy is totally increased.

As stated above, the aluminum film 1 is formed on the outer surface of the quartz tube 2 by an appropriate method such as CVD, PVD or vacuum evaporation. A surface roughness of the aluminum film 1 is, therefore, substantially equal to a surface roughness of the outer surface of the quartz tube 2. The surface roughness measurement of the quartz tube is approximately several tenths of a micron. It is therefore possible to easily obtain an excellent reflective surface whose roughness is far smaller than a polished surface roughness measurement of several microns formed by a method such as electrolytic polishing and the like.

Aluminum is a metal exhibiting a high reflectivity with respect to the ultraviolet rays but is easily oxidized. Therefore, if placed in the air, the surface is immediately covered with a film composed mainly of aluminum oxide which brings about a drop in the reflection for the laser beams. According to this embodiment, however, the aluminum film 1 is formed in a high vacuum atmosphere as in the case of CVD, PVD or vacuum evaporation. Besides, the reflection surface for reflecting the laser beams is formed to closely contact the outer surface of the quartz tube 2. Hence, the reflection surface is not exposed to the air at all, and therefore the reflectivity does not decrease since the surface is not covered with the oxide film.

Figure 5:
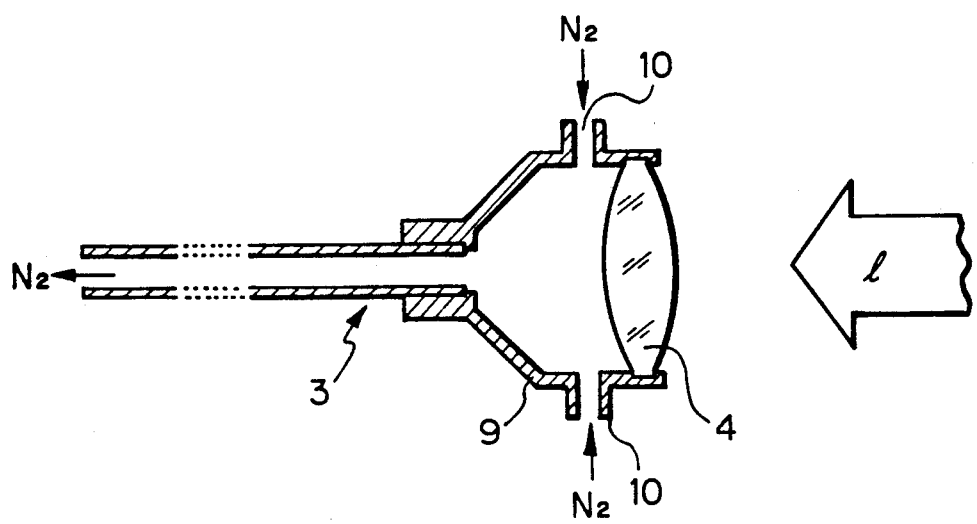
FIG. 5 is a diagram schematically illustrating a system for transmitting the laser beams while flowing a nitrogen gas into the waveguide.
Figure 6A:
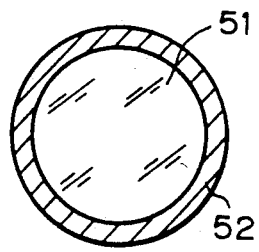
FIGS. 6(a), 7(a) and 8(a) are cross-sectional views
Figure 6B:
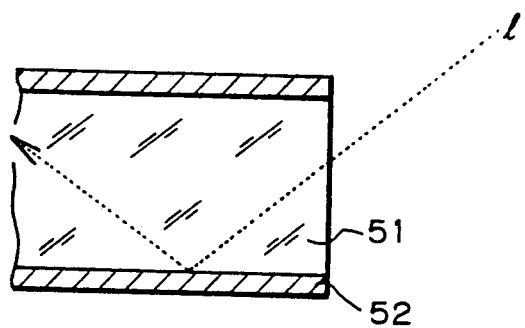
FIGS. 6(b), 7(b) and 8(b) are longitudinal sectional views thereof.
Figure 7A:
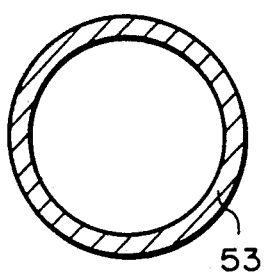
Figure 7B:
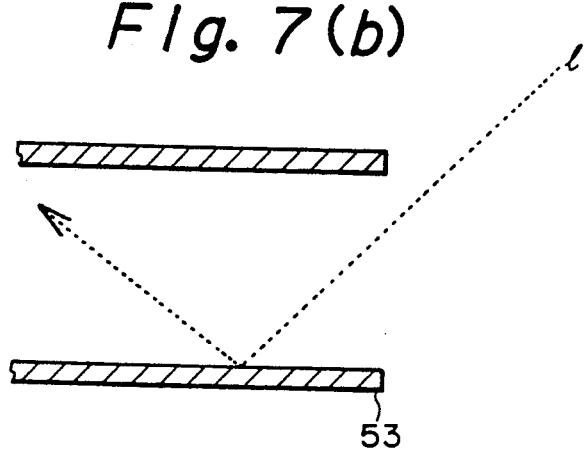
Figure 8A:
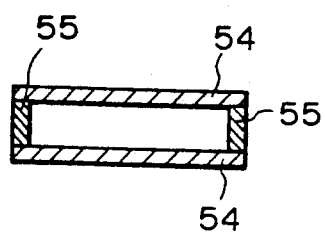
Figure 8B:
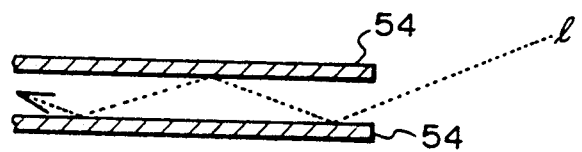

FIG. 5 is a diagram schematically illustrating another embodiment of the invention. It shows a system for transmitting the laser beams while permitting nitrogen gas $N_2$ to flow into the waveguide. A housing 9 is mounted on the incident end portion of the waveguide 3 for communicating therewith. Gas inflow ports 10 are formed in the housing 9 and the condenser lens 4 is mounted on an incident side of the housing 9. The laser beams 1 are incident on the waveguide 3 through the lens 4 (see FIG. 4) while flowing the nitrogen gas $N_2$ into the waveguide 3 from this gas inflow port 10. Since the nitrogen gas is a material which has a high transmissivity for ultraviolet rays, it acts to restrain an attenuation of the transmissivity due to an absorption of the ultraviolet rays. The nitrogen gas also acts to prevent an inflow of foreign materials into the waveguide 3 from the outside. The nitrogen gas further acts to cool off the waveguide 3.

Note that the quartz tube 2 is employed as a glass tube of the waveguide 3 in above embodiment, but the glass is not limited to the quartz on condition that it exhibits a high transmissivity to the ultraviolet rays and an excellent environment resistant property. For example, synthetic resins having a high transmissivity to the light of an ultraviolet region could be used instead of the quartz.

The metal film on the outer surface of the glass tube involved the use of the aluminum film 1. The metal of this film is not, however, limited to aluminum on condition that it exhibits a high reflectivity with respect to the ultraviolet rays.

The nitrogen gas is used as a substance flowing through the waveguide 3. The substance is not, however, limited to the nitrogen gas on condition that it is a fluid composed of a substance having a high transmissivity to the ultraviolet rays. For example, an inert gas such as Ar, He could be used instead of the nitrogen gas.

As discussed above, the present invention yields the following superior advantages.

(1) Since the glass tube is used as a waveguide, the laser beams are incident on the inner surface of this glass tube. Therefore, the damage threshold value of the incident energy becomes totally large because of the incident area being relatively large.

(2) The metal film is formed on the outer surface of the glass tube, so that the surface roughness measurement of the metal film is equal to the surface roughness measurement of the outer surface of the glass tube. The surface roughness measurement of the outer surface of the glass tube is approximately several tenths of a micron. It is therefore feasible to easily obtain the excellent reflective surface whose surface roughness is far smaller than the polished surface roughness measurement of several microns formed by the method such as electrolytic polishing and the like.

(3) The reflective surface of the metal film closely contacts the outer surface of the glass tube. Hence, the reflective surface is not exposed to the air during a formation and even after the formation. Therefore, the reflectivity of the reflective surface does not decrease since the surface is not covered with the oxide film.

(4) When the fluid of the substance exhibiting a high transmissivity to the ultraviolet rays flows in a space within the waveguide, the efficiency of transmission is improved, and at the same time, a drop in transmission rate in terms of time is reduced owing to cooling effects thereof.

What is claimed is:

1. A hollow waveguide for ultraviolet wavelength region laser beams, comprising:
    a glass tube composed of a glass material exhibiting a high transmissivity with respect to ultraviolet rays and an excellent environment resistant property, said glass tube serving as an inner surface of said waveguide said glass tube being formed from quartz; and
    a metal film exhibiting a high reflectivity with respect to the ultraviolet rays and formed outside said glass tube, a refractive index of said glass tube being formed higher than a refractive index of said metal film whereby said ultraviolet wavelength region laser beams are transmitted while being reflected by the inner surface of said glass tube and by an interface between said glass tube and said metal film, said metal film being formed from aluminum.

2. The waveguide as set forth in claim 1, wherein said aluminum film is formed by CVD, PVD or vacuum evaporation.

3. The waveguide as set forth in claim 1, wherein the surface roughness depth of said metal film which is in contact with said glass tube is several tenths of a micron.

4. The waveguide as set forth in claim 1, further comprising:
    a gas having a high ultraviolet ray transmissivity flowing through a space within said glass tube.

5. The waveguide as set forth in claim 4, further comprising: a housing mounted on an incident end portion of said waveguide for communicating therewith; a gas inflow port is formed in said housing and a condenser lens is mounted on incident side of said housing.

* * * * *